(12) United States Patent
Tatsuya et al.

(10) Patent No.: US 7,162,945 B2
(45) Date of Patent: Jan. 16, 2007

(54) TORSIONAL RIGIDITY CONTROL DEVICE

(75) Inventors: Masamura Tatsuya, Tokyo (JP); Hagidaira Shinichi, Tokyo (JP)

(73) Assignee: Kayaba Kogyo Kabushiki Kaisha (JP)

( * ) Notice: Subject to any disclaimer, the term of this patent is extended or adjusted under 35 U.S.C. 154(b) by 167 days.

(21) Appl. No.: 10/503,760

(22) PCT Filed: Oct. 10, 2003

(86) PCT No.: PCT/JP03/13030

§ 371 (c)(1),
(2), (4) Date: Aug. 4, 2004

(87) PCT Pub. No.: WO2004/035333

PCT Pub. Date: Apr. 29, 2004

(65) Prior Publication Data

US 2005/0079066 A1    Apr. 14, 2005

(30) Foreign Application Priority Data

Oct. 18, 2002    (JP) ............................. 2002-304488

(51) Int. Cl.
*F15B 11/042* (2006.01)
(52) U.S. Cl. ..................................................... 91/441
(58) Field of Classification Search ................... 91/441
See application file for complete search history.

(56) References Cited

FOREIGN PATENT DOCUMENTS

| JP | 6-320930 | 11/1994 |
|---|---|---|
| JP | 7-300010 | 11/1995 |
| JP | 9-156338 | 6/1997 |
| JP | 2981109 | 9/1999 |
| JP | 2000-71739 | 3/2000 |
| JP | 2002-13502 | 1/2002 |

*Primary Examiner*—F. Daniel Lopez
(74) *Attorney, Agent, or Firm*—McGlew & Tuttle, P.C.

(57) ABSTRACT

A torsional rigidity control device capable of controlling a moment provided to stabilizers (1*f*) and (1*r*) against the moment based on an external moment loaded from the outside to the stabilizers (1*f*) and (1*r*), comprising a moment variable mechanism for varying the moment loaded on the stabilizers (1*f*) and (1*r*) by regulating a fluid pressure supplied from a fluid pressure source driving rotary actuators (2*f*) and (2*r*) connected to the intermediate parts or one ends of the stabilizers (1*f*) and (1*r*) or the cylinders (51*f*) and (51*r*) connected to one ends of the stabilizers (1*f*) and (1*r*), characterized in that the necessary value of the fluid pressure for driving the rotary actuators (2*f*) and (2*r*) or the cylinders (51*f*) and (51*r*) is calculated based on the value of the external moment, the value of the fluid pressure supplied to the rotary actuators (2*f*) and (2*r*) or cylinders (51*f*) and (51*r*) is compared with the necessary value of the fluid pressure, and based on the compared result, the fluid pressure is regulated to control the moment, whereby a stable torsional rigidity can be developed by stabilizing a fluid pressure in a pressure chamber to increase a riding comfortableness at the time of rolling of a vehicle even when the device is mounted on the vehicle.

17 Claims, 3 Drawing Sheets

TORSIONAL RIGIDITY CONTROL DEVICE

FIELD OF ART

The present invention relates to a torsional rigidity control device capable of imparting a moment to a member against an external moment loaded on the member and more particularly to a torsional rigidity control device for stabilizers, the torsional rigidity control device being mounted on a vehicle or the like and connected to stabilizers so as to be capable of controlling a torsional rigidity of the stabilizers.

BACKGROUND ART

Heretofore, as this type of a torsional rigidity control device there has been known, for example, an oil pressure variable type torsional rigidity control device for stabilizers disclosed in Japanese Patent Laid-Open No. H09(1997)-156338.

According to this conventional device, stabilizers which connect suspension arms of right and left wheels of each of front and rear wheels are each divided in two at a central part of a torsion bar and one of the thus-bisected portions is fixed to a housing side of a hydraulic rotary actuator (hereinafter referred to simply as "actuator") for changing a torsional rigidity of each stabilizer, while the other portion is fixed to a rotor side of the actuator.

Corresponding pressure chambers in both actuators disposed on the front and rear wheel sides are respectively brought into communication with differential pressure control valves through conduits, and one conduits communicating with the differential pressure control valves are brought into communication with an oil pressure source through a fail safe valve and a flow dividing valve, while the other conduits are brought into communication with an oil pressure source through a fail safe valve.

Switching solenoids of each differential pressure control valve and fail safe valve are connected to a control device which outputs a vehicle lateral acceleration signal corresponding to the direction and magnitude of a lateral acceleration generated on the vehicle body side.

When a lateral acceleration acts on the vehicle body during travel, the above control device detects the direction and magnitude of the lateral acceleration as a vehicle lateral acceleration signal, then, with this vehicle lateral acceleration signal, switches the fail safe valve from a normal position to an offset position and controls the differential pressure control valves switchingly and correspondingly to the direction and magnitude of the vehicle lateral acceleration signal.

When no lateral acceleration is exerted on the vehicle body such as during vehicular straight running, the control device, while keeping the differential pressure control valves in their neutral position with zero differential pressure under a reference electric current, cuts off the supply of an electric current to the fail safe valve, keeping the fail safe valve in the normal position and allowing the valve to block the actuators provided in the stabilizers for the front and rear wheels, and causes the stabilizers to act as ordinary stabilizers.

On the other hand, when the vehicle begins to turn (cornering) and a lateral acceleration acts on the vehicle body, an electric current is supplied to the fail safe valve in accordance with the vehicle lateral acceleration signal detected by the control device to switch the fail safe valve to the offset position and bring the oil pressure source into an on-load condition, and the differential pressure control valves are put in communication with the actuators.

At the same time, the control device generates a control signal current deviated from a reference value to either positive or negative side correspondingly to the direction and magnitude of the lateral acceleration.

With this control signal current, the differential pressure control valves perform a switching operation by a predetermined amount in a predetermined direction correspondingly to the direction and magnitude of the lateral acceleration exerted on the vehicle body, and differential pressures developed in the differential pressure control valves are controlled and then fed independently to the actuators provided in the front and rear wheel stabilizers.

As a result, the actuators generate moments in a direction corresponding to the direction and magnitude of the vehicle lateral acceleration and, with these moments, a torsional rigidity is imparted to the stabilizers for the front and rear wheels. Then, with a centrifugal force developed at this time, a rolling moment acting in a direction opposite to and competing with a rolling moment acting on the vehicle body is imparted to the vehicle body to effectively suppress the rolling motion generated in the vehicle body.

The torsional rigidity control device described above involves no problems in point of function, but it is desired to remedy the following inconvenience.

In the above torsional rigidity control device for stabilizers, the supply of an oil pressure to pressure chambers is controlled using differential pressure control valves and therefore, there sometimes occurs a case where even if a moment acting in a direction corresponding to the direction and magnitude of a vehicle lateral acceleration, which each actuator must generate, is to be generated, it is impossible to do so.

That is, it is a differential pressure in each pressure chamber that can be controlled, and since the differential pressure is a relative pressure, the oil pressure within each pressure chamber in each actuator connected to the associated stabilizer varies depending on an input provided from a road surface. Therefore, it is necessary to constantly control and maintain a differential pressure in each pressure chamber corresponding to a generated moment. Moreover, because of a differential pressure, an oil pressure required is not determined unambiguously, so that the control becomes complicated and there arises a fear that the oil pressure may become unstable.

DISCLOSURE OF THE INVENTION

The present invention has been accomplished for remedying the above-mentioned inconvenience and it is an object of the invention to provide a torsional rigidity control device capable of stabilizing a fluid pressure in a pressure chamber, thereby exhibiting a stable torsional rigidity and improving a riding comfortableness during rolling of a vehicle even when the device is mounted on the vehicle.

According to the present invention, for achieving the above-mentioned object, there is provided, as a basic means, a torsional rigidity control device for controlling a moment to be imparted to a member against an external moment loaded on the member from the exterior, the torsional rigidity control device comprising a moment variable mechanism for varying a moment to be loaded on the member by regulating a fluid pressure supplied from a fluid pressure source, the fluid pressure source functioning to drive a rotary actuator connected to an intermediate part or one end of the member or drive a cylinder connected to one end of the member, characterized in that a necessary fluid pressure value for driving the rotary actuator or the cylinder is calculated on the basis of the value of the external moment, then the value of the fluid pressure being supplied to the rotary actuator or the cylinder is compared with the necessary fluid pressure value, and based on the result of the comparison, the fluid pressure is regulated to control the moment.

As a concrete means of using a stabilizer as the member there is provided a torsional rigidity control device for controlling a moment to be imparted to a stabilizer against an external moment loaded on the stabilizer from the exterior, the torsional rigidity control device comprising a moment variable mechanism for varying a moment to be loaded on the stabilizer by regulating a fluid pressure supplied from a fluid pressure source, the fluid pressure source functioning to drive a rotary actuator connected to an intermediate part or one end of the stabilizer or drive a cylinder connected to one end of the stabilizer, characterized in that a necessary fluid pressure value for driving the rotary actuator or the cylinder is calculated on the basis of the value of the external moment, then the value of the fluid pressure being supplied to the rotary actuator or the cylinder is compared with the necessary fluid pressure value, and based on the result of the comparison, the fluid pressure is regulated to control the moment.

In the above concrete means, the stabilizer is provided in a plural number, rotary actuators are connected to intermediate parts or one ends of the stabilizers or cylinders are connected to one ends of the stabilizers, and the moment to be imparted to each of the stabilizers against the external moment is controlled.

In the above concrete means, a flow dividing valve is disposed between the fluid pressure source and the rotary actuator or the cylinder, the moment variable mechanism is disposed for each said member on the rotary actuator side or the cylinder side with respect to the flow dividing valve, and the moment to be imparted to each member is controlled.

In the above concrete means, the moment variable mechanism comprises a supply flow path connected to the fluid pressure source, a discharge flow path connected to a reservoir, two supply/discharge flow paths connected respectively to two pressure chambers formed in either the rotary actuator or the cylinder, a solenoid-operated pressure control valve connected to between the supply flow path and the discharge flow path, and a solenoid-operated direction switching valve for connecting the supply flow path and the discharge flow path to one of the two supply/discharge flow paths selectively.

An opening area of the pressure control valve becomes maximum in a de-energized state of the solenoid, while in an energized state of the solenoid the opening area is adjusted in accordance with an applied electric current, and the direction switching valve shuts off the fluid pressure in a de-energized state of the solenoid and supplies the fluid pressure when the solenoid is energized.

A check valve which permits only a fluid flow from the supply flow path side to the discharge flow path side, as well as a relief valve, are disposed between the supply flow path and the discharge flow path and in parallel with the pressure control valve.

The value of the fluid pressure being supplied to the rotary actuator or the cylinder is detected by a pressure sensor, the necessary fluid pressure value for driving the rotary actuator or the cylinder is calculated by a controller on the basis of the value of the external moment, then the detected fluid pressure value is compared with the necessary fluid pressure value, and based on the result of the comparison, the pressure control valve and the direction switching valve are controlled switchingly to control the external moment.

Further, the external moment is calculated on the basis of a vehicle lateral acceleration, or a vehicle lateral acceleration, a vehicle speed and a steering angle, or a vehicle lateral acceleration, a vehicle speed, a steering angle and a yaw rate.

As a more concrete means there is provided a torsional rigidity control device for regulating a torsional rigidity of a stabilizer by driving a rotary actuator or a cylinder each having two pressure chambers opposed to each other, the rotary actuator being connected to an intermediate part or one end of the stabilizer and the cylinder being connected to one end of the stabilizer, the rotary actuator and the cylinder being adapted to be driven by the supply or discharge of working oil to or from each pressure chamber, the torsional rigidity control device comprising a solenoid-operated direction switching valve for establishing or blocking communication of each of the pressure chambers with a supply flow path or a discharge flow path selectively, a pressure control valve disposed between the supply flow path and the discharge flow path, an opening area of the pressure control valve becoming maximum in a de-energized state thereof and being adjustable in an energized state thereof, and a controller, characterized in that, based on internal pressures of the pressure chambers and a vehicle lateral acceleration, a steering angle, a vehicle speed and a yaw rate, the controller applies an electric current to the solenoid-operated direction switching valve and the pressure control valve, adjusts the opening area of the pressure control valve in proportion to the electric current, and switches the solenoid-operated direction switching valve to either a communication position or a cut-off position.

BEST MODE FOR CARRYING OUT THE INVENTION

Figure 1:
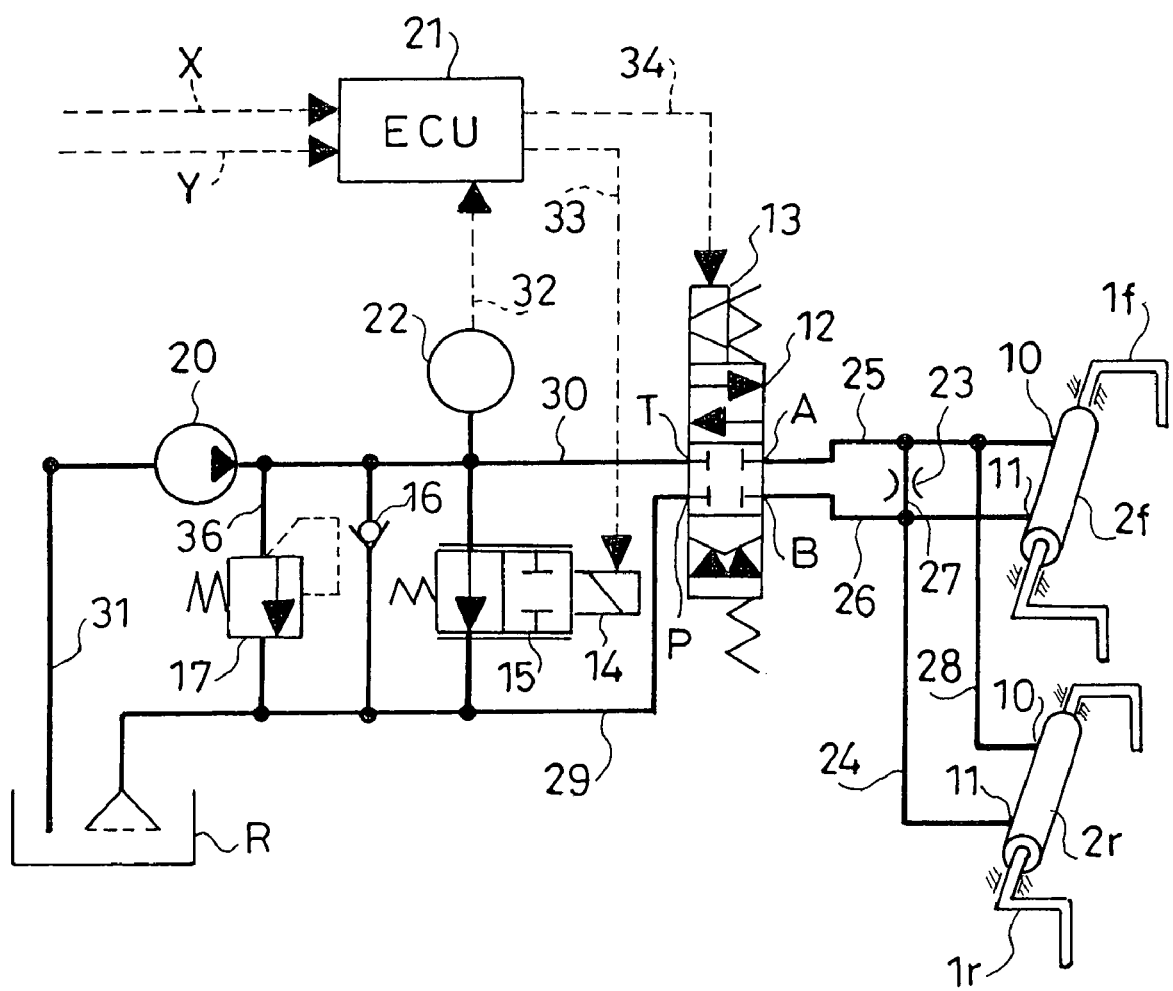
FIG. 1 is a hydraulic circuit diagram showing systematically a torsional rigidity control device according to an embodiment of the present invention.

FIG. 1 illustrates as a system diagram a torsional rigidity control device according to an embodiment of the present invention as applied to controlling stabilizers.

A stabilizer $1f$ for a front wheel, as a member, is constituted by dividing the portion of a torsion bar centrally into two portions. One of the thus-divided portions is fixed to a housing side of a hydraulic rotary actuator $2f$ disposed on the front wheel side, while the other portion is fixed to a rotor side of the actuator. Thus, in this embodiment, a fluid pressure is an oil pressure.

Likewise, a stabilizer $1r$ for a rear wheel, as a member, is also divided centrally into two portions, and one of the thus-divided portions is connected to a housing side of a rotary actuator $2r$ disposed on the rear wheel side, while the other portion is connected to a rotor side of the actuator.

Figure 3:
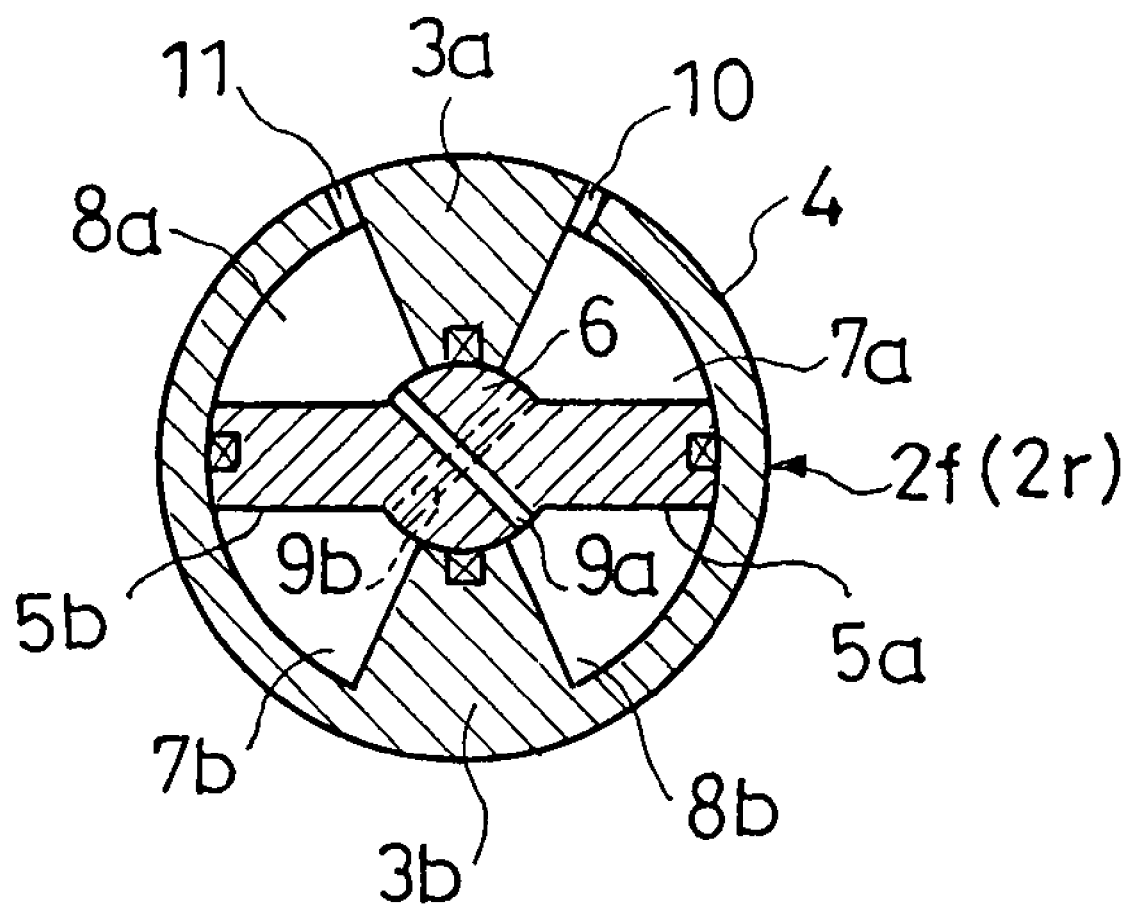
FIG. 3 is a vertical sectional view of an actuator.

In this embodiment, as shown in FIG. 3, the rotary actuator $2f$ disposed on the front wheel side and the rotary actuator $2r$ on the rear wheel side are each made up of a housing 4 and a rotor 6 received pivotably within the housing 4, the housing 4 having two partition walls 3a and 3b formed on an inner wall of the housing and spaced from each other at 180° interval, the rotor 6 having two vanes 5a and 5b formed on an outer periphery surface of the rotor in the interior of the housing 4 and spaced from each other also at 180° interval.

In the rotor 6, outer periphery portions of a central portion of the rotor are put in sliding contact with inner ends of the partition walls 3a and 3b formed on the inner wall of the housing 4, and outer peripheries of outer ends of the vanes 5a and 5b are put in sliding contact with the inner wall of the housing 4. Thus, the interior of the housing 4 is partitioned into four pressure chambers 7a, 7b, 8a, and 8b by the rotor 6.

Of the four pressure chambers 7a, 7b, 8a, and 8b, the pressure chambers 7a and 7b which lie in diagonal positions are in communication with each other through a through hole 9b and likewise the pressure chambers 8a and 8b lying in diagonal positions are in communication with each other through a through hole 9a. Further, ports 10 and 11 are formed in the housing 4 so as to be open to the pressure chambers 7a and 8a, respectively.

With this construction, the actuators 2f and 2r provide an oil pressure as a fluid pressure to the pressure chambers 7a, 7b and 8a, 8b through the ports 10 and 11, respectively, thereby imparting a torsional force acting in a predetermined direction to the stabilizers 1f and 1r.

In this way the actuator 2f on the front wheel side acts as a rigidity variable actuator for the front wheel stabilizer 1f, while the actuator 2r on the rear wheel side acts as a rigidity variable actuator for the rear wheel stabilizer 1r.

Turning back to FIG. 1, the actuator 2f on the front wheel side is connected to a solenoid-operated direction switching valve 12 of a push-pull type through supply/discharge flow paths 25 and 26 which are connected to the ports 10 and 11, respectively, in the pressure chambers, while the actuator 2r on the rear wheel side is connected to the direction switching valve 12 through supply/discharge flow paths 24 and 28 branching from the supply/discharge flow paths 25 and 26 which are connected to the ports 10 and 11 in the pressure chambers. The supply/discharge flow paths 25 and 26 are in communication with each other through a bypass 27, with an orifice 23 of an extremely small diameter being formed in a suitable position of the bypass 27.

The ports 10 and 11 of the actuators 2f and 2r are connected to control ports A and B of the direction switching valve 12 in such a manner that those corresponding to each other namely those that rolling reaction of the same direction works are connected either the port A or B. That is, the supply/discharge flow paths 25 and 26 are connected to the ports A and B, respectively, of the direction switching valve 12 and are brought into or out of communication with a supply flow path 30 and a discharge flow path 29 selectively through the direction switching valve 12. Further, a solenoid pressure control valve 15, a check valve 16 and a relief valve 17 are disposed between the supply flow path 30 and the discharge flow path 29.

More specifically, a supply port T formed in the direction switching valve 12 is connected to an upstream side of the pressure control valve 15 through the supply flow path 30 and is successively in communication with further upstream sides of the supply flow path 30, i.e., an upstream side of the check valve 16 which blocks the flow of working oil from the supply flow path 30, an upstream side of the relief valve 17, and a hydraulic pump 20 as a fluid pressure source.

On the other hand, a discharge port P formed in the direction switching valve 12 is connected to a downstream side of the pressure control valve 15 through the discharge flow path 29 and is successively in further communication with a downstream side of the check valve 16, a downstream side of the relief valve 17 and a reservoir R.

The reservoir R and the hydraulic pump 20 are put in communication with each other through a suction pipe 31. Working oil supplied from the hydraulic pump 20 is conducted finally to the reservoir R and recycles through the flow paths 30, 29, 24, 25, 26, and 28.

The direction switching valve 12 is a three-position four-port valve having a communication position in which the supply port T connected to the supply flow path 30 and the discharge port P are brought into communication with the control ports A and B, respectively, a cut-off position to block the ports, and a communication position in which the supply port T connected to the supply flow path 30 and the discharge port P are brought into communication with the control ports B and A, respectively. Springs are disposed at both ends of the direction switching valve 12, and a solenoid 13 is disposed at one end of the direction switching valve 12 in an opposed relation to one spring. When an electric current is applied to one coil (not shown) of the solenoid 13, the ports T and P are put in communication with the ports A and B, respectively, while when an electric current is applied to the other coil (not shown) of the solenoid, the ports T and P are put in communication with the ports B and A, respectively. With no electric current applied, the ports T, P, A, and B are blocked with spring force, as shown in the figure. The direction switching valve is designed so as to normally take any of the foregoing communication positions when an electric current is applied.

The pressure control valve 15 has a communication position for communication between the supply flow path 30 and the discharge flow path 29 and a cut-off position for blocking communication between both flow paths. The pressure control valve 15 is provided at one end thereof with a spring (not shown) and at an opposite end thereof with a solenoid 14 in an opposed relation to the spring. When the solenoid 14 is energized, it is possible to make switching to the cut-off position, and an opening area of the pressure control valve 15 can be controlled in proportion to an electric current applied to the solenoid 14. Therefore, with no electric current applied to the solenoid 14, the valve 15 is held in the communication position by virtue of spring force and its opening area becomes maximum. The pressure control valve 15 is designed so as to normally assume the cut-off position in an energized state of the solenoid 14.

As publicly known, the relief valve 17 is disposed at a suitable position of a communication path 36 which connects the supply flow path 30 and the discharge flow path 29 with each other, and it has a communication position for making communication of the communication path 36 and a cut-off position for breaking the communication. When the internal pressure of the supply flow path 30 rises to an abnormal extent, the relief valve 17 opens with a pilot pressure to let the working oil escape to the reservoir R. Instead of disposing the communication path 36 so as to provide connection between the supply flow path 30 and the discharge flow path 29, the communication path 36 may be separately provided independently.

As to the check valve 16, a conventional check valve commonly used widely in various hydraulic devices may be used as it is. Since the construction thereof is well known, a detailed explanation thereof will here be omitted.

A pressure sensor 22 for detecting an oil pressure loaded on the actuators 2f and 2r is disposed at a suitable position of the supply flow path 30 and detects an internal oil pressure of the supply flow path 30. With the pressure sensor 22 disposed in such a position, it is possible to detect internal pressures of the pressure chambers 7a and 8a in the actuators 2f and 2r while the ports of the direction switching valve 12 is in a state of communication.

Thus, in the above description, a variable mechanism is made up of supply flow path 30, discharge flow path 29, actuators 2f, 2r, direction switching valve 12, supply/discharge flow paths 25, 26, 24, 28, and pressure control valve 15.

In combination with the above components there is provided an ECU 21 as a controller for adjusting the opening area of the pressure control valve 15 on the basis of a lateral acceleration exerted on the vehicle body, a steering angle, a vehicle speed and an oil pressure signal and for controlling a torsional rigidity of the stabilizers 1f and 1r through the actuators 2f and 2r while controlling the direction switching valve 12 switchingly. In the case where rolling of the vehicle is to be suppressed, the control may be made on the basis of only the lateral acceleration.

For example, the ECU 21 is connected to a lateral acceleration sensor (not shown) (e.g., a lateral acceleration sensor disposed in a position concerned of the vehicle body) which detects as a lateral acceleration signal the direction and magnitude of a lateral acceleration acting on the vehicle body, a steering angle sensor (not shown) which detects a steering angle as a signal, a vehicle speed sensor (not shown) which detects the vehicle speed as a signal, and the pressure sensor 22. The ECU 21 processes these lateral acceleration signal, steering angle signal, vehicle speed signal and pressure signal and applies an electric current to the solenoids 13 and 14, causing the direction switching valve 12 and the pressure control valve 15 to perform a controlling operation.

The ECU 21 has two output terminals (not shown), which output terminals are connected to the solenoid 13 of the direction switching valve 12 and the solenoid 14 of the pressure control valve 15 by signal lines 33, 34 so that both valves are controlled by the ECU 21.

Next, a description will be given below of the operation of the torsional rigidity control device of this embodiment constructed as above.

For example, when the vehicle is running straight ahead on a flat road, that is, when no detected signal X is provided from the lateral acceleration sensor and the steering angle sensor, the vehicle body does not undergo rolling and therefore the riding comfortableness is deteriorated if the torsional rigidity of the stabilizers as members is enhanced. In such a state, the ECU 21 suppresses the supply of an electric current to the solenoid 14 of the pressure control valve 15 and enlarges the opening area of the valve to weaken the function of the stabilizers. As a result, in accordance with the valve opening area, the working oil from the hydraulic pump 20 recycles from the discharge flow path 29 to the reservoir R through the communication position in the pressure control valve 15. Further, an electric current is fed to the solenoid 13 of the direction switching valve 12 to provide communication of the foregoing ports. In this case, it is optional whether the ports T and P are to be communicated with the ports A and B, respectively, or the ports T and P are to be communicated with the ports B and A, respectively, insofar as the ports of the direction switching valve 12 are in a state of communication.

A concrete processing carried out by the ECU 21 in the above operation is as follows. First, when both lateral acceleration and steering angle are zero, that is, when there is no signal input from any of the sensors, the vehicle is running straight ahead on a flat road, so the ECU 21 recognizes that the moment loaded on the stabilizers is zero, and decreases the torsional rigidity to weaken the function of the stabilizers. In this case, the ECU 21 calculates that the pressure chambers of the actuators 2f and 2r should be kept in an unloaded state of any oil pressure, that is, the necessary oil pressure value is zero. Then, in order to stop the supply of oil pressure to the pressure chambers, the ECU 21 suppresses the supply of an electric current to the pressure control valve 15 as described above. At this time, the ECU 21 compares the value of oil pressure detected by the pressure sensor 22 with the value of oil pressure calculated above, and if the detected oil pressure value is larger than the calculated oil pressure value, the ECU 21 diminishes the electric current fed to the pressure control valve 15 and enlarges the opening area of the pressure control valve 15, making control so that the calculated oil pressure value and the detected oil pressure value become equal to each other. On the other hand, an electric current is supplied to the direction switching valve 12 so as to provide communication of the ports as described above. In this case, therefore, as noted earlier, the working oil fed from the hydraulic pump 20 passes through the pressure control valve 15 preferentially and enters the reservoir R, thus permitting control into a state in which no oil pressure is loaded on the actuators 2f and 2r.

In the case where the vehicle is running straight ahead on a flat road as described above, a control may be made such that no electric current is supplied to the pressure control valve 15, allowing the valve opening area to become maximum unconditionally.

Thus, in the torsional rigidity control device according to the present invention, the oil pressure loaded into each of the pressure chambers of the actuators 2f and 2r can be made zero, and even when the device suddenly receives an input from a road surface during vehicular straight running, it is possible to effectively prevent the exhibition of the stabilizers' function because the oil pressure in each pressure chamber is zero. On the other hand, in the conventional torsional rigidity control device using differential pressure control valves, since it is only a differential pressure that is controlled, a control is made so as to eliminate a differential pressure in each pressure chamber during vehicular straight running. In this case, if actuators are moved forcibly by a sudden input from a road surface, there occurs a bias of oil pressure in each pressure chamber, resulting in that the stabilizers' function is exhibited although it should be weakened, and the riding comfortableness is deteriorated. In the torsional rigidity control device according to the present invention, it is possible to improve the riding comfortableness in comparison with the conventional device using a differential pressure control.

When the vehicle begins to turn and a vehicle lateral acceleration occurs such as at the time of cornering or when the steering angle is large at a high vehicle speed, signals X and Y detected by the lateral acceleration sensor, steering angle sensor and vehicle speed sensor are inputted to the ECU 21.

On the basis of the detected signals X and Y the ECU 21 increases the electric current fed to the solenoid 14 of the pressure control valve 15 through a signal line 33 from an output terminal and adjusts the opening area of the pressure control valve 15 to a smaller or larger size.

On the basis of signals provided from the lateral acceleration sensor, steering angle sensor and vehicle speed sensor, the ECU 21 calculates a moment to be loaded on the stabilizers, as well as a direction thereof, correspondingly to the magnitude and direction of an external moment acting on the vehicle body at that time and loaded on the stabilizers, and then outputs a control signal based on the results of the calculation as an electric current from each output terminal.

Control signal currents outputted each individually from output terminals of the ECU 21 are fed through signal lines 33 and 34 to corresponding solenoids 14 and 13 of the pressure control valve 15 and the direction switching valve 12, respectively, to control both valves separately.

Then, correspondingly to the external moment loaded on the stabilizers and in order to load on the stabilizers a moment in a direction to oppose the external moment, the direction switching valve 12 switches to any of the foregoing communication positions and switches the communication of ports such that the ports T and P are put in communication with the ports A and B, respectively, or the ports T and P are put in communication with the ports B and A, respectively, allowing the working oil supplied from the hydraulic pump 20 to flow from the supply/discharge flow paths 25, 26, 24, and 28 to either the ports 10 or the ports 11 in the actuators 2f and 2r.

With the working oil thus admitted to either the ports 10 or the ports 11 in the actuators 2f and 2r, the oil pressure in the pressure chambers on the working oil-admitted side increases. For example, in FIG. 3, when the working oil is supplied into the pressure chambers 7a and 7b in the actuators 2f and 2r, the vanes 5a and 5b rotate clockwise, while when the working oil is supplied into the other pressure chambers 8a and 8b, the vanes 5a and 5b rotate counterclockwise. As a result, moments acting in the clockwise or counterclockwise direction are developed in the actuators 2f and 2r, and with these moments, a torsional rigidity opposing the external moment exerted on the stabilizers 1f and 1f for the front and rear wheels can be imparted to the stabilizers. Consequently, it becomes possible to prevent rolling of the vehicle body. That is, when rolling is apt to occur in the vehicle body, the front/rear wheel stabilizers 1f, 1r are twisted in a direction to tilt the vehicle body to the opposite side in conformity with the magnitude of the lateral acceleration. As a result, the torsional rigidity of the stabilizers 1f and 1r in that direction is increased to suppress the occurrence of a rolling motion in the vehicle body. It suffices for the torsional rigidity control device to make a control suitable for characteristics of the vehicle on which the device is mounted, and therefore the magnitude of a moment to be loaded on the stabilizers against the external moment may be calculated by the ECU so as to assume a value matching the characteristics of the vehicle.

A concrete processing performed by the ECU 21 during rolling of the vehicle body described above is as follows. First, on the basis of a lateral acceleration, vehicle speed and steering angle, the ECU 21 recognizes that the vehicle body is rolling and increases the torsional rigidity to let the function of the stabilizers be exhibited, as noted earlier. In this case, an oil pressure should be applied to any of the pressure chambers in each of the actuators 2f and 2r to impose a moment on the stabilizers, that is, the value of an oil pressure necessary for generating a moment to be loaded on the stabilizers is calculated.

For supplying a necessary oil pressure to any of the pressure chambers in each of the actuators 2f and 2r, the ECU 21 increases or decreases the electric current to be supplied to the pressure control valve 15 as described above. At this time, the ECU 21 compares the value of oil pressure detected by the pressure sensor 22 with the above calculated value of oil pressure and, if the detected value is larger than the calculated value, decreases the electric current supplied to the pressure control valve 15 to increase the opening area of the same valve. Conversely, if the detected value of oil pressure is smaller than the calculated value, the ECU 21 increases the electric current supplied to the pressure control valve 15 to decrease the opening area of the same valve. Thus, the ECU 21 makes control so that the calculated value of oil pressure and the detected value of oil pressure become equal to each other. In the meantime, an electric current is supplied to the direction switching valve 12 so as to provide communication of the ports of the same valve. In this case, therefore, the working oil supplied from the hydraulic pump 20 is divided working oil passing through the pressure control valve 15 and working oil flowing into the actuators 2f and 2r. It is possible to effect control into a state in which the oil pressure calculated by the ECU 21 is loaded on the actuators 2f and 2r.

Although in this embodiment the oil pressure within each pressure chamber in each actuator is detected by the pressure sensor, it is not always necessary to use the pressure sensor. If the capacity of the hydraulic pump is determined in advance, the level of oil pressure applied to each pressure chamber can be grasped in terms of an opening area of the pressure control valve. In this case, therefore, the ECU may be allowed to recognize the value of oil pressure on the basis of how much electric power is supplied to the pressure control valve.

In the torsional rigidity control device according to the present invention, as described above, the oil pressure loaded into each of the pressure chambers in the actuators 2f and 2r can be set to an optimal value and the opening area of the pressure control valve can be changed, so that the oil pressure loaded into each pressure chamber can be finely controlled, that is, a highly accurate control can be effected. More particularly, unlike the conventional differential pressure control for each pressure chamber, since the oil pressure loaded into each pressure chamber is controlled directly, even if the oil pressure loaded into each of the pressure chambers in the actuators connected to the stabilizers varies by a sudden input from a road surface, the oil pressure loaded into each pressure chamber can be grasped in real time and hence it is possible to maintain and control the moment to be loaded on the actuators. Besides, since the control is not a differential pressure control which is difficult to perform, the control is easy and it is possible to supply an oil pressure stably to the actuators, so that the rolling suppressing effect is high and the riding comfortableness during rolling of the vehicle is improved.

In this connection, if the actuators are moved forcibly with an input provided from a road surface, there may occur a case where the supply of working oil in an amount larger than the delivery of the oil pressure source is required. In such a case, the internal pressure of the supply flow path 30 becomes a negative pressure, the working oil pushes open the check valve 16 which connects the supply flow path 30 and the discharge flow path 29 with each other, and the working oil in an amount corresponding to the deficiency thereof can be supplied into the supply flow path 30. Therefore, there is no fear of occurrence of such as noise as in the conventional torsional rigidity control device, and the fluid pressure in each pressure chamber can be made more stable. That is, the stabilizer function can be exhibited stably.

In the event there should occur any trouble in the torsional rigidity control device or in the vehicle on which the device is mounted and the device or the vehicle should become uncontrollable, or in the event of occurrence of any trouble in the control system such as breaking of the signal lines 33 and 34 for the direction switching valve 12 and the pressure control valve 15, the ECU 21 detects the trouble and stops the operation of both valves 12 and 15.

Then, with a spring force, the pressure control valve 15 maximizes the valve opening area, and also with a spring force, the direction switching valve 12 shifts to its position of blocking the ports. As a result, the working oil supplied from the hydraulic pump 20 passes through the pressure control valve 15 and flows into the reservoir R, thus recycling between the hydraulic pump 20 and the reservoir R, with no oil pressure loaded on the actuators 2f and 2r. Under this situation, even if the oil pressure in any of the pressure chambers in each of the actuators 2f and 2r rises and the actuators 2f and 2r assumed a twisted state, since the bypass 27 is connected to the supply/discharge flow paths 25, 26, 24, and 28 through the orifice 23, the oil pressures in the pressure chambers finally become equal, and even when the vehicle assumes a straight-running state, it does not tilt, but can retain its normal body posture. Even in the event of rolling of the vehicle body, since the orifice 23 is disposed at an intermediate position of the bypass 27, the movement of working oil from port 10 to port 11 in the actuators 2f and 2r is suppressed, so that the stabilizer function can be exhibited. Further, even when the vehicle body rolls in one direction, the stabilizers 1f and 1r are prevented from performing reverse motions on the front and rear wheel side, and even on an irregular road surface on which the front and rear wheel-side stabilizers are twisted in reverse directions, since the ports 10 in the actuators 2f and 2r are communicated with each other and so are the ports 11, the stabilizers 1f and 1r are twisted freely without resistance and a satisfactory riding comfortableness is ensured without transfer of any input from the road surface to the vehicle body. In a normal condition, since the orifice 23 is very small in diameter, the working oil preferentially passes through the supply/discharge flow paths 25, 26, 24, and 28 and is prevented from passing through the bypass 27.

In an abnormal condition, even if the pressure control valve 15 should be closed by contamination for example, since the oil pressure within the supply flow path 30 rises, the relief valve 17 disposed in the communication path 36 is opened and the working oil supplied from the hydraulic pump 20 flows into the reservoir R, so that the torsional rigidity control device is prevented from damage.

Therefore, even if an external force acting to twist the stabilizers 1f and 1r is exerted on the stabilizers, the stabilizers 1f and 1r suppress rolling of the vehicle body while maintaining at least their normal function as stabilizers through the actuators 2f and 2r which are rigidized by blocking the flow of working oil with the direction switching valve 12 and while ensuring a state closer to normal steering characteristics.

Thus, upon occurrence of any trouble in the control system during control of rolling of the vehicle body in cornering, the torsional rigidity of the stabilizers 1f and 1r for the front and rear wheels is maintained in a state being controlled while keeping the actuators 2f and 2r blocked.

Even when such a fail safe operation is performed, the rolling rigidity of the vehicle body and steering characteristics do not change before and after the fail safe operation and this operation can be done positively without causing any large change in the vehicle steering characteristics.

Figure 2:
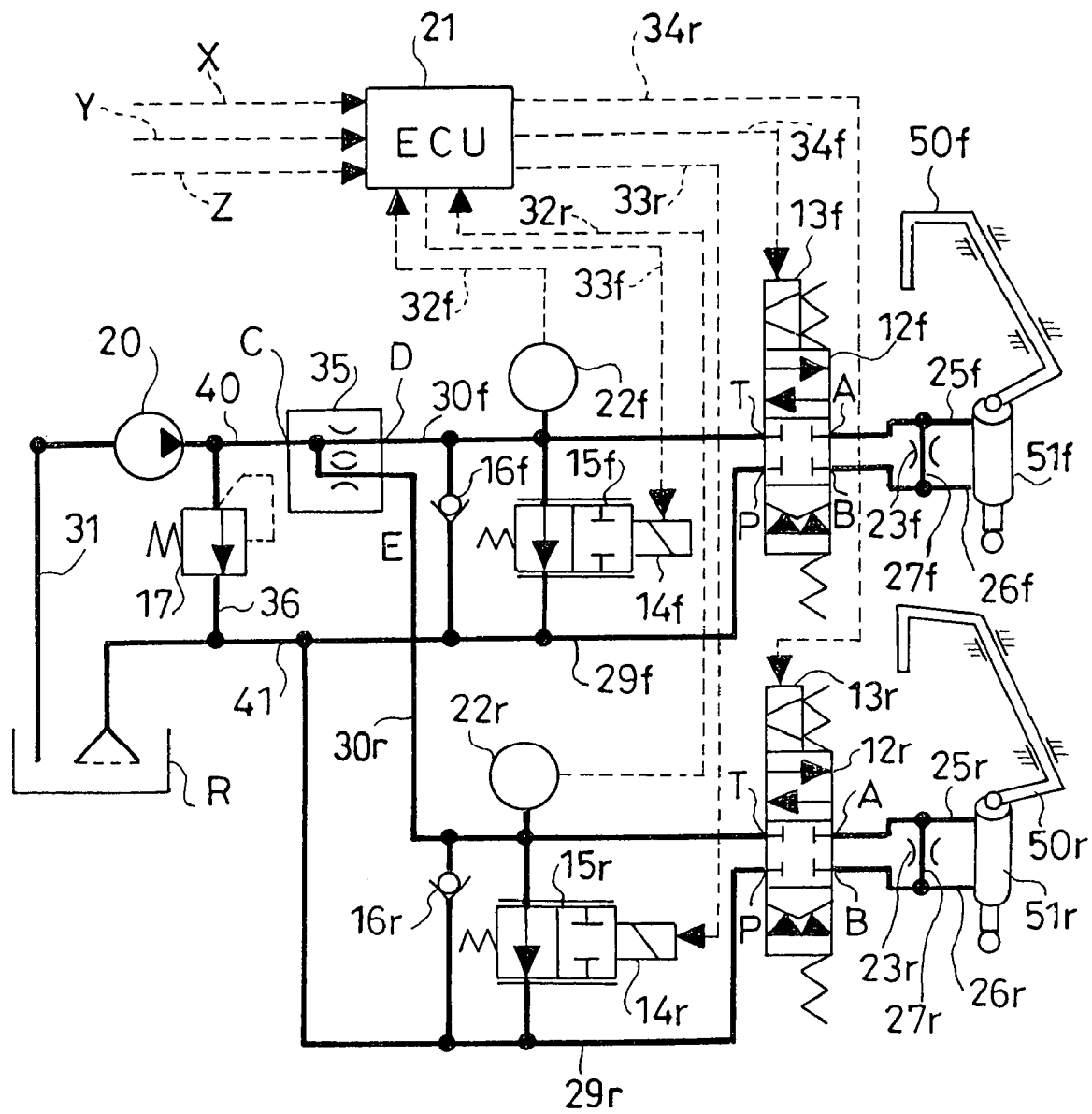
FIG. 2 is a hydraulic circuit diagram showing systematically a torsional rigidity control device according to another, or second, embodiment of the present invention.

Next, another embodiment of the present invention will be described. FIG. 2 illustrates as a system diagram a torsional rigidity control device according to another embodiment of the present invention. In this second embodiment, in order to avoid tautological explanations, the same components as in the previous first embodiment are identified by the same reference numerals as in the first embodiment and detailed explanations thereof will be omitted.

In the torsional rigidity control device of this second embodiment, for example, cylinders 51f and 51r of a double rod type each having two opposed pressure chambers are connected to one ends of stabilizers 50f and 50r as members disposed on front and rear wheel sides of the vehicle. The same moment variable mechanism as in the first embodiment is connected to each of the cylinders 51f and 51r. Further, supply flow paths 30f and 30r are connected to a flow dividing valve 35 and an upstream side of the flow dividing valve 35 is connected to a supply flow path 40 which is connected to a hydraulic pump 20. Discharge flow paths 29f and 29r are connected to a reservoir R through a discharge flow path 41, and a communication path 36 is formed so as to provide communication between the supply flow path 40 and the discharge flow path 41, with a relief valve 17 being disposed at a suitable position of the communication path 36.

This second embodiment is different from the first embodiment in that the moment variable mechanism is provided for each of the front and rear wheel-side cylinders 51f, 51r, that the flow dividing valve 35 is disposed upstream of the supply flow path 30, and that ECU 21 inputs a yaw rate in addition to lateral acceleration, steering angle and vehicle speed and calculates moments to be loaded on the stabilizers 50f and 50r.

These different points will now be described in more detail. Ports T in direction switching valves 12f and 12r are connected to output ports D and E of the flow dividing valve 35 through the supply flow paths 30f and 30r extending respectively from the ports T. An inlet port C of the flow dividing valve 35 communicates with the hydraulic pump 20 through the supply flow path 40.

Further, in this second embodiment, for fail safe in the event of trouble occurrence, the relief valve 17 is disposed at a suitable position of the communication path 36 which provides a connection between the supply flow path 40 located upstream of the flow dividing valve 35 and the discharge flow path 41 located on the discharge side.

As the flow dividing valve 35, a conventional flow dividing valve commonly used widely in various hydraulic devices may be used as it is. Since the construction thereof is well known, a detailed explanation thereof will here be omitted.

The operation of the torsional rigidity control device of this second embodiment is basically the same as in the first embodiment, but in this second embodiment the working oil supplied from the hydraulic pump 20 is divided by the flow dividing valve 35 and the thus-divided flows are fed into the pressure ports T in the direction switching valves 12f and 12r.

The flow dividing valve 35 divides the working oil supplied from the hydraulic pump 20 at a predetermined flow ratio and distributes the thus-divided working oil flows to the actuators 2f and 2r through the direction switching valves 12f and 12r.

The flow ratio for dividing the working oil in the flow dividing valve 35 may be determined so as to match the condition in which the torsional rigidity control device is used or, in this embodiment, in such a manner that moments capable of being developed by the cylinders 51f and 51r are suitable for the vehicle on which the device is mounted.

On the other hand, on the basis of signals provided from the lateral acceleration sensor, steering angle sensor, vehicle speed sensor and yaw rate sensor, the ECU 21 calculates the direction and magnitude of an external moment loaded (from the vehicle body) on the stabilizers 50f and 50r, then successively calculates corresponding moments to be loaded on the stabilizers 50f and 50r, and outputs the thus-calculated values as control signal currents from output terminals (not shown).

Then, in the same way as in the first embodiment, the ECU 21 calculates front/rear wheel-side oil pressures to be loaded into one of the pressure chambers in each of the cylinders 51f and 51r which pressures are necessary for generating moments to be applied, then compares the thus-calculated oil pressure values with oil pressure values detected by corresponding pressure sensors 22f and 22r, then increases or decreases the electric current to be supplied to pressure control valves 15f, 15r and direction switching valves 12f, 12r, and makes control so as to equalize the detected oil pressure values to the calculated oil pressure values.

In the previous first embodiment only the same moment can be loaded on the front- and rear-side stabilizers 1f, 1r because the same oil pressure is applied to the stabilizers, but in this second embodiment, in addition to the function and effect attained in the first embodiment, the front and rear side can be controlled each independently and hence moments more suitable to the vehicular running condition can be loaded on the stabilizers 50f and 50r.

When rolling is about to occur in the vehicle body, the stabilizers 50f and 50r for the front and rear wheels are twisted in a direction in which the vehicle body tends to be tilted to the opposite side in accordance with the magnitude of a lateral acceleration, whereby the torsional rigidity in that direction of the stabilizers 50f and 50r is increased and the rolling motion about to occur in the vehicle body is suppressed. This is the same as in the first embodiment.

Moreover, as noted above, since the torsional rigidities of the stabilizers 50f and 50r for the front and rear wheels can be controlled each independently, it is possible to ensure a sharp steering characteristic and let the vehicle run in a stable state while coping with yawing exerted on the vehicle body and improving the turning and converging performance of the vehicle.

Further, even if the load imposed on the rear wheel side increases due to a live load, resulting in an increase in the amount of load shift on the rear wheel side, there is no fear of a reaction moment on the rear wheel side becoming deficient with retention of rolling or the steering characteristic being changed depending on the magnitude of the live load.

In this second embodiment, since the flow dividing valve is disposed and front and rear moment variable mechanisms are installed independently of each other, the front and rear stabilizers can be controlled each independently and it is possible to effect control more suitable to the vehicular running condition. Besides, plural hydraulic pumps are not needed, it is also possible to decrease the power consumption.

On the other hand, in the event any trouble should occur in the vehicle on which the torsional rigidity control device is mounted, with consequent occurrence of an uncontrollable state, irrespective of whether during straight running or cornering of the vehicle, or in the event of occurrence of any trouble in the control system such as breaking of signal lines 33f, 33r, 34r, and 34f for the direction switching valves 12f, 12r and the pressure control valves 15f and 15r, the ECU 21 detects this condition and stops the operation of the direction switching valves 12f, 12r and the pressure control valves 15f, 15r, in the same way as in the first embodiment, so that the opening area of the pressure control valves 15f and 15r becomes maximum and the direction switching valves 12f and 12r assume their cut-off position.

In this second embodiment, the oil pressures in the pressure chambers of the cylinders 51f and 51r are averaged by bypasses 27f and 27r which respectively provide connections between supply/discharge flow paths 25f and 26f and between supply/discharge flow paths 25r and 26r, the flow paths 25f, 26f and the flow paths 25r, 26r being connected to the cylinders 51f and 51r, respectively, and at the same time the stabilizer function can be exhibited as a matter of course. In this connection, since the pressure chambers in the cylinders 51f and 51r are completely independent between front and rear sides, the stabilizer function can be exhibited even in such a state as the stabilizers 50f and 50r being twisted in opposite directions on the front and rear wheel sides.

As noted earlier, it goes without saying that cylinders other than rotary actuators are also employable for applying moments to the stabilizers as members and that the torsional rigidity control device is employable in a situation where it is necessary to change the torsional rigidity of the member against an external moment. In the case where the torsional rigidity control device is used in any other object than the vehicle, the device will be designed so as to calculate moments to be loaded on the members on the basis of any other elements than lateral acceleration, vehicle speed, etc.

Although the above embodiments have been described in connection with the case where the torsional rigidity control device of the present invention is applied to vehicular stabilizers, it goes without saying that the scope of the present invention is not limited to the illustrated or explained details themselves.

The following effects are obtained according to the present invention.

According to the claimed invention, the fluid pressure applied to the pressure chambers in the actuators or cylinders can be made zero, and even if there is a sudden input to such members as stabilizers, the members can move freely without any resistance because there is no fluid pressure in each pressure chamber. This is advantageous over the prior art wherein the members cannot be moved completely freely without any resistance.

Further, a fluid pressure is supplied directly to the pressure chambers unlike the prior art wherein differential pressure control valves are used, and the fluid pressure in each pressure chamber can be grasped in real time, so that it is possible to stabilize the fluid pressure in each pressure chamber and generate a satisfactory torsional rigidity. Besides, the control is easy because it is not a differential pressure control that is difficult to perform, thereby it is possible to supply fluid pressure stably to the actuators or the cylinders. Consequently, it is possible to impart a stable moment to the members and hence a stable torsional rigidity can be exhibited.

Since the torsional rigidities of plural members can be controlled by one fluid pressure source, it is possible to decrease the power consumption.

Since the flow dividing valve is disposed and the moment variable mechanisms are provided front and rear each independently, it is possible to control the members each independently and hence possible to impart independent moments to the members. Accordingly, different torsional rigidities can be exerted on the members.

Even in the event a trouble should occur in the torsional rigidity control device and the device should come into an uncontrollable state, resulting in the valves being unable to be supplied with an electric current, the pressure control valve maximizes it opening area, the direction switching valves shuts off the fluid pressure, and the two pressure chambers are communicated with each other through a bypass with an orifice formed at an intermediate position, so that the exhibition of the torsional rigidity which each member itself possesses is not prevented. Moreover, since the pressure control valve can change its opening area, it is possible to finely adjust the fluid pressure and hence possible to effect a highly accurate control.

Even when a large moment is imposed on the members and the members are moved at high speed, with consequent deficiency in the amount of fluid supplied from the fluid pressure source, it is possible to supply fluid from the check valve side, so that the supply flow path does not become negative in pressure, whereby the generation of a noise from the device is suppressed and the fluid pressure loaded into the pressure chamber of the actuators or cylinders becomes stable. That is, the moment imparted to the members becomes stable and therefore a more stable torsional rigidity can be exhibited.

Even in the case where a trouble occurs in the torsional rigidity control device and the device comes into an uncontrollable state, with each valve being unable to be supplied with an electric current and with the pressure control valve closed by contamination for example, the fluid pressure supplied from the fluid pressure source and present within the supply flow path increases, so that the relief valves disposed in the communication path is opened and the fluid pressure flows into the reservoir, whereby the torsional rigidity control device is prevented from damage.

The pressure sensor detects a fluid pressure value within each pressure chamber in the actuators or cylinders in real time and the controller makes control while comparing the detected value with a required fluid pressure value which it has calculated, so that it is not only possible to make a finer control but also possible to make the internal fluid pressure of each pressure chamber in the actuators or cylinders more stable than in the conventional torsional rigidity control device.

Since this torsional rigidity control device is applied to a vehicle and causes a change in torsional rigidity of the stabilizers, it is possible to suppress and control rolling of the vehicle. Moreover, as described above, since it is possible to load a stable fluid pressure on the actuators or cylinders, it is possible to stabilize a moment to be imparted to the stabilizers. Consequently, the effect of suppressing a vehicular rolling is higher than that in the conventional device and the riding comfortableness is improved.

Since controlling the moment to be imparted to the stabilizers and changing the torsional rigidity of the stabilizers are effected on the basis of a vehicular lateral acceleration, it is possible to effectively suppress rolling of the vehicle body. Besides, since the internal fluid pressure of each pressure chamber in the actuators or cylinders can be made stable as compared with that in the conventional torsional rigidity control device, it is possible to further improve the riding comfortableness. Even during what is called fail safe, at least the stabilizer function can be maintained and exhibited while preventing damage of the torsional rigidity control device, and it is possible to suppress rolling of the vehicle body while maintaining a state closer to the normal steering characteristic.

Even if a fail safe operation is performed, the vehicle body rolling rigidity and steering characteristic do not change before and after the fail safe operation and the same operation can be done positively without causing any great change in the vehicular steering characteristic.

Since a moment to be loaded on the stabilizers is calculated on the basis of not only a lateral acceleration but also a vehicle speed and a steering angle, it is possible to effect control more suitable to the vehicular running condition, whereby the riding comfortableness is improved.

Since a moment to be loaded on the stabilizers is calculated on the basis of lateral acceleration, vehicle speed, steering angle, and yaw rate, if the torsional rigidity of the stabilizer for the front wheel and that for the rear wheel are controlled each independently, it is possible to ensure a sharp steering characteristic and let the vehicle run in a stable state while coping with yawing exerted on the vehicle body and improving the turning and converging performance of the vehicle. Further, even if the load imposed on the rear wheel side increases due to a live load, resulting in an increase in the amount of load shift on the rear wheel side, there is no fear of a reaction moment on the rear wheel side becoming deficient with retention of rolling or the steering characteristic being changed depending on the magnitude of the live load. Therefore, it becomes possible to make a control more suitable for the vehicular running condition and the riding comfortableness of the vehicle is improved.

Since the stabilizers' torsional rigidity is changed on the basis of lateral acceleration, vehicle speed, steering angle and yaw rate, it is possible to suppress rolling of the vehicle body effectively. Besides, since the internal fluid pressure of each pressure chamber in the actuators or cylinders can be stabilized in comparison with the conventional torsional rigidity control device, the riding comfortableness can be further improved. Also in what is called fail safe, at least the stabilizer function can be maintained and exhibited while preventing damage of the torsional rigidity control device, and rolling of the vehicle body is suppressed while retaining a state closer to the normal steering characteristic. If the torsional rigidities of the stabilizers for the front and rear wheels are controlled each independently, it is possible to keep the steering characteristic sharp and let the vehicle run in a stable state while coping with yawing exerted on the vehicle body and improving the vehicular turning and converging performance in cornering. Further, even if the load imposed on the rear wheel side increases due to a live load, resulting in an increase in the amount of load shift on the rear wheel side, there is no fear of a reaction moment on the rear wheel side becoming deficient with retention of rolling or the steering characteristic being changed depending on the magnitude of the live load. Consequently, a control more suitable for the vehicular running condition can be effected and the riding comfortableness of the vehicle is improved.

The invention claimed is:

1. A torsional rigidity control device comprising:
a moment variable means for regulating a fluid pressure supplied from a fluid pressure source by calculating a necessary fluid pressure value and comparing said necessary fluid pressure value to an actual value of fluid pressure supplied to a rotary actuator or a cylinder, said fluid pressure controlling a moment loaded on a stabilizer based on the comparison of said necessary fluid pressure value and said actual value to counteract an external moment applied to the stabilizer, said fluid pressure source driving a rotary actuator connected to an intermediate part or one end of the stabilizer, or driving said cylinder connected to one end of the stabilizer;
a supply flow path connected to said fluid pressure source;
a discharge flow path connected to a reservoir;

two supply/discharge flow paths connected respectively to two pressure chambers formed in said rotary actuator or said cylinder;
a pressure control valve connected to said supply flow path and said discharge flow path;
a direction switching valve for connecting said supply flow path and said discharge flow path to one of said two supply/discharge flow paths selectively; and
a check valve permitting only a fluid flow from said supply flow path side to said discharge flow path side and a relief valve disposed between the supply flow path and the discharge flow path and in parallel with said pressure control valve.

2. A torsional rigidity control device according to claim 1, wherein said stabilizer is provided in a plural number, rotary actuators are connected to intermediate parts or one ends of the stabilizers or cylinders are connected to one ends of the stabilizers, and a moment to be imparted to each of the stabilizers against the external moment is controlled.

3. A torsional rigidity control device according to claim 2, wherein said external moment is calculated on the basis of a vehicle lateral acceleration, or a vehicle lateral acceleration, a vehicle speed and a steering angle, or a vehicle lateral acceleration, a vehicle speed, a steering angle and a yaw rate.

4. A torsional rigidity control device according to claim 1, wherein a flow dividing valve is disposed between said fluid pressure source and said rotary actuator or said cylinder, said moment variable means is disposed for each said stabilizer on the rotary actuator side or the cylinder side with respect to said flow dividing valve, and the moment to be imparted to each member is controlled.

5. A torsional rigidity control device according to claim 4, wherein said external moment is calculated on the basis of a vehicle lateral acceleration, or a vehicle lateral acceleration, a vehicle speed and a steering angle, or a vehicle lateral acceleration, a vehicle speed, a steering angle and a yaw rate.

6. A torsional rigidity control device according to claim 1, wherein an opening area of said pressure control valve becomes maximum in a de-energized state of the solenoid, while in an energized state of the solenoid said opening area is adjusted in accordance with an applied electric current, and said direction switching valve shuts off the fluid pressure in a de-energized state of the solenoid and supplies the fluid pressure when the solenoid is energized.

7. A torsional rigidity control device according to claim 6, wherein said external moment is calculated on the basis of a vehicle lateral acceleration, or a vehicle lateral acceleration, a vehicle speed and a steering angle, or a vehicle lateral acceleration, a vehicle speed, a steering angle and a yaw rate.

8. A torsional rigidity control device according to claim 1, wherein the value of the fluid pressure being supplied to said rotary actuator or said cylinder is detected by a pressure sensor, said necessary fluid pressure value for driving said rotary actuator or said cylinder being calculated by a controller on the basis of the value of said external moment, the detected fluid pressure value being compared with the necessary fluid pressure value, and based on the result of the comparison, said pressure control valve and said direction switching valve are controlled switchingly to control said external moment based on comparison of said detected fluid pressure value and said necessary fluid pressure value.

9. A torsional rigidity control device according to claim 8, wherein said external moment is calculated on the basis of a vehicle lateral acceleration, or a vehicle lateral acceleration, a vehicle speed and a steering angle, or a vehicle lateral acceleration, a vehicle speed, a steering angle and a yaw rate.

10. A torsional rigidity control device according to claim 1, wherein said external moment is calculated on the basis of a vehicle lateral acceleration, or a vehicle lateral acceleration, a vehicle speed and a steering angle, or a vehicle lateral acceleration, a vehicle speed, a steering angle and a yaw rate.

11. A torsional rigidity control device comprising:
a rotary actuator or a cylinder having two pressure chambers opposed to each other, said rotary actuator being connected to an intermediate part or one end of a stabilizer and said cylinder being connected to one end of said stabilizer, said rotary actuator and said cylinder being adapted to be driven by the supply or discharge of working oil to or from each of said pressure chambers;
a pressure sensor for detecting oil pressure applied to said rotary actuator or said cylinder;
a solenoid-operated direction switching valve for establishing or blocking communication of each of said pressure chambers with a supply flow path or a discharge flow path selectively;
a pressure control valve disposed between said supply flow path and said discharge flow path, an opening area of said pressure control valve becoming maximum in a de-energized state thereof and being adjustable in an energized state thereof;
a controller for controlling oil pressure from a oil pressure source, said controller calculating a necessary oil pressure value based on a vehicle lateral acceleration, a steering angle, a vehicle speed and a yaw rate, said controller comparing the necessary oil pressure value with the oil pressure detected from said pressure sensor, said controller applying an electric current to said solenoid-operated direction switching valve and said pressure control valve, said controller adjusting the opening area of said pressure control valve in proportion to the electric current, and switching said solenoid-operated direction switching valve to either a communication position or a cut-off position;
two supply/discharge flow paths connected respectively to said two pressure chambers in said rotary actuator or said cylinder;
a check valve permitting only a fluid flow from said supply flow path side to said discharge flow path side and a relief valve disposed between the supply flow path and the discharge flow path and in parallel with said pressure control valve
a pressure control valve connected to said supply flow path and said discharge flow path; and
a direction switching valve for connecting said supply flow path and said discharge flow path to one of said two supply/discharge flow paths selectively.

12. A torsional rigidity control device comprising:
a stabilizer;
a rotary actuator or cylinder;
a moment control means for controlling a moment to be loaded on said stabilizer to counteract external moments applied to the stabilizer by regulating a fluid pressure supplied from a fluid pressure source such that a necessary pressure value is calculated from the external moment loaded on the stabilizer and compared to an actual value of fluid pressure supplied to said rotary actuator or said cylinder, whereby said moment variable means equalizes the actual fluid pressure to the necessary pressure value, said fluid pressure source functioning to drive said rotary actuator with said rotary actuator connected to an intermediate part or one end of the stabilizer or to drive said cylinder with said cylinder connected to one end of said stabilizer, said fluid pressure source driving said rotary actuator connected to an intermediate part or one end of the stabilizer or driving said cylinder connected to one end of the stabilizer;

a supply flow path connected to said fluid pressure source;

a discharge flow path connected to a reservoir;

a check valve permitting only a fluid flow from said supply flow path side to said discharge flow path side and a relief valve disposed between the supply flow path and the discharge flow path and in parallel with said pressure control valve;

two supply/discharge flow paths connected respectively to two pressure chambers formed in said rotary actuator or said cylinder; and a pressure control valve connected to said supply flow path and said discharge flow path.

13. A torsional rigidity control device according to claim 12, wherein said stabilizer is provided in a plural number, rotary actuators are connected to intermediate parts or one ends of the stabilizers or cylinders are connected to one ends of the stabilizers, and a moment to be imparted to each of the stabilizers against the external moment is controlled.

14. A torsional rigidity control device according to claim 12, wherein a flow dividing valve is disposed between said fluid pressure source and said rotary actuator or said cylinder, said moment variable means is disposed for each said stabilizer on the rotary actuator side or the cylinder side with respect to said flow dividing valve, and the moment to be imparted to each stabilizer is controlled.

15. A torsional rigidity control device according to claim 12, wherein an opening area of said pressure control valve becomes maximum in a de-energized state of the solenoid, while in an energized state of the solenoid said opening area is adjusted in accordance with an applied electric current, and said direction switching valve shuts off the fluid pressure in a de-energized state of the solenoid and supplies the fluid pressure when the solenoid is energized.

16. A torsional rigidity control device according to claim 12, wherein the value of the fluid pressure being supplied to said rotary actuator or said cylinder is detected by a pressure sensor, said necessary fluid pressure value for driving said rotary actuator or said cylinder being calculated by a controller on the basis of the value of said external moment, the detected fluid pressure value being compared with the necessary fluid pressure value, and based on the result of the comparison, said pressure control valve and said direction switching valve are controlled switchingly to control said external moment based on comparison of said detected fluid pressure value and said necessary fluid pressure value.

17. A torsional rigidity control device according to claim 12, wherein said external moment is calculated on the basis of a vehicle lateral acceleration, or a vehicle lateral acceleration, a vehicle speed and a steering angle, or a vehicle lateral acceleration, a vehicle speed, a steering angle and a yaw rate.

* * * * *

UNITED STATES PATENT AND TRADEMARK OFFICE
CERTIFICATE OF CORRECTION

PATENT NO. : 7,162,945 B2
APPLICATION NO. : 10/503760
DATED : January 16, 2007
INVENTOR(S) : Masamura Tatsuya and Hagidaira Shinichi It is certified that error appears in the above-identified patent and that said Letters Patent is hereby corrected as shown below:

Delete claims 1 & 12 and substitute with the following text therefor;
A torsional rigidity control device comprising: a moment variable means for regulating a fluid pressure supplied from a fluid pressure source by calculating a necessary fluid pressure value and comparing said necessary fluid pressure value to an actual value of fluid pressure supplied to a rotary actuator or a cylinder, said fluid pressure controlling a moment loaded on a stabilizer based on the comparison of said necessary fluid pressure value and said actual value to counteract an external moment applied to the stabilizer, said fluid pressure source driving a rotary actuator connected to an intermediate part or one end of the stabilizer, or driving said cylinder connected to one end of the stabilizer; a supply flow path connected to said fluid pressure source; a discharge flow path connected to a reservoir; two supply/discharge flow paths connected respectively to two pressure chambers formed in said rotary actuator or said cylinder; a pressure control valve connected to said supply flow path and said discharge flow path; a direction switching valve for connecting said supply flow path and said discharge flow path to one of said two supply/discharge flow paths selectively; and a check valve permitting only a fluid flow from said discharge flow path side to said supply flow path side and a relief valve disposed between the supply flow path and the discharge flow path and in parallel with said pressure control valve.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,162,945 B2
APPLICATION NO. : 10/503760
DATED : January 16, 2007
INVENTOR(S) : Masamura Tatsuya and Hagidaira Shinichi It is certified that error appears in the above-identified patent and that said Letters Patent is hereby corrected as shown below:

Column 16, line 52 - Column 17, line 3
Delete claim 1 and substitute with the following text therefor;

A torsional rigidity control device comprising: a moment variable means for regulating a fluid pressure supplied from a fluid pressure source by calculating a necessary fluid pressure value and comparing said necessary fluid pressure value to an actual value of fluid pressure supplied to a rotary actuator or a cylinder, said fluid pressure controlling a moment loaded on a stabilizer based on the comparison of said necessary fluid pressure value and said actual value to counteract an external moment applied to the stabilizer, said fluid pressure source driving a rotary actuator connected to an intermediate part or one end of the stabilizer, or driving said cylinder connected to one end of the stabilizer; a supply flow path connected to said fluid pressure source; a discharge flow path connected to a reservoir; two supply/discharge flow paths connected respectively to two pressure chambers formed in said rotary actuator or said cylinder; a pressure control valve connected to said supply flow path and said discharge flow path; a direction switching valve for connecting said supply flow path and said discharge flow path to one of said two supply/discharge flow paths selectively; and a check valve permitting only a fluid flow from said discharge flow path side to said supply flow path side and a relief valve disposed between the supply flow path and the discharge flow path and in parallel with said pressure control valve.

Column 18, line 56 - Column 19, line 21, claim 12 should read;

12. A torsional rigidity control device comprising: a stabilizer; a rotary actuator or cylinder; a moment control means for controlling a moment to be loaded on said stabilizer to counteract external moments applied to the stabilizer by regulating a fluid pressure supplied from a fluid pressure source such that a necessary pressure value is calculated from the external moment loaded on the stabilizer and compared to an actual value of fluid pressure supplied to said rotary actuator or said cylinder, whereby said moment variable means equalizes the actual fluid pressure to the necessary pressure value, said fluid pressure source functioning to drive said rotary actuator with said rotary actuator connected to an intermediate part or one end of the stabilizer or to drive said cylinder with said cylinder connected to This certificate supersedes the Certificate of Correction issued April 27, 2010.

Signed and Sealed this

Eighteenth Day of May, 2010

David J. Kappos
*Director of the United States Patent and Trademark Office* one end of said stabilizer, said fluid pressure source driving said rotary actuator connected to an intermediate part or one end of the stabilizer or driving said cylinder connected to one end of the stabilizer; a supply flow path connected to said fluid pressure source; a discharge flow path connected to a reservoir; a check valve permitting only a fluid flow from said discharge flow path side to said supply flow path side and a relief valve disposed between the supply flow path and the discharge flow path and in parallel with said pressure control valve; two supply/discharge flow paths connected respectively to two pressure chambers formed in said rotary actuator or said cylinder; and a pressure control valve connected to said supply flow path and said discharge flow path.